(12) United States Patent
Kobilka et al.

(10) Patent No.: US 10,583,972 B2
(45) Date of Patent: Mar. 10, 2020

(54) POLYMER WITH BLUE LIGHT ABSORBING UNITS CHEMICALLY BONDED TO A POLYERMIC BACKBONE OF THE POLYMER

(71) Applicant: International Business Machines Corporation, Armonk, NY (US)

(72) Inventors: Brandon M. Kobilka, Tucson, AZ (US); Joseph Kuczynski, North Port, FL (US); Jacob T. Porter, Highland, NY (US); Jason T. Wertz, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/277,766

(22) Filed: Feb. 15, 2019

(65) Prior Publication Data
US 2019/0177062 A1    Jun. 13, 2019

Related U.S. Application Data

(62) Division of application No. 15/175,390, filed on Jun. 7, 2016, now Pat. No. 10,266,325.

(51) Int. Cl.
*B65D 65/20* (2006.01)
*C08F 210/02* (2006.01)
(Continued)

(52) U.S. Cl.
CPC .......... *B65D 65/20* (2013.01); *B29C 49/0005* (2013.01); *C08F 210/02* (2013.01);
(Continued)

(58) Field of Classification Search
USPC ....................................... 526/284
See application file for complete search history.

(56) References Cited

U.S. PATENT DOCUMENTS 3,764,590 A    10/1973  Mukoh et al.
6,312,839 B1   11/2001  Kim et al.
(Continued)

FOREIGN PATENT DOCUMENTS

CN    103804560 A  *  5/2014   ............ C08F 212/32
CN    103044244        9/2014
(Continued)

OTHER PUBLICATIONS

Online translation of Description of CN 103804560 A retrieved from ESPACENET; publication date: May 2014 (Year: 2014).*
(Continued)

*Primary Examiner* — Fred M Teskin
(74) *Attorney, Agent, or Firm* — Patterson + Sheridan, LLP

(57) ABSTRACT

In an embodiment, a polymer includes less than 99.5 percent by weight of units derived from one or more olefin monomers. The polymer also includes greater than 0.5 percent by weight of units derived from one or more blue light absorbing monomers. In another embodiment, a method includes placing a heated parison of a polymer in a mold. The polymer is formed by polymerizing a mixture of one or more olefin monomers and one or more blue light absorbing monomers. The polymer has one or more blue light absorption characteristics. The method includes closing the mold. The method includes injecting gas into the parison to form a container in the mold. The method also includes removing the container from the mold.

20 Claims, 5 Drawing Sheets

(51) Int. Cl.
*C08F 212/32* (2006.01)
*B29C 49/00* (2006.01)
*G08B 5/22* (2006.01)
*G02B 5/22* (2006.01)
*B29K 23/00* (2006.01)
*B29K 105/00* (2006.01)
*B29L 31/00* (2006.01)

(52) U.S. Cl.
CPC ............ *G02B 5/22* (2013.01); *B29K 2023/00* (2013.01); *B29K 2105/0002* (2013.01); *B29K 2995/0018* (2013.01); *B29L 2031/7158* (2013.01)

(56) References Cited

U.S. PATENT DOCUMENTS

| | | | |
|---|---|---|---|
| 6,730,419 | B2 | 5/2004 | Kim et al. |
| 6,773,104 | B2 | 8/2004 | Cornelius et al. |
| 7,433,118 | B2 | 10/2008 | Taylor-Smith |
| 7,537,842 | B2 | 5/2009 | Burn et al. |
| 8,389,130 | B2 | 3/2013 | Grizzi et al. |
| 9,056,934 | B2 * | 6/2015 | Mentak ................ C08F 220/26 |
| 2003/0100681 | A1 | 5/2003 | Yu |
| 2015/0016688 | A1 | 1/2015 | Aller |
| 2015/0274954 | A1 | 10/2015 | Sunaga et al. |
| 2017/0351015 | A1 | 12/2017 | Kobilk et al. |

FOREIGN PATENT DOCUMENTS

| | | |
|---|---|---|
| CN | 105001855 | 10/2015 |
| JP | 5381286 | 1/2014 |
| WO | 2006113205 | 10/2006 |

OTHER PUBLICATIONS

Wang et al, "Blue fluorescent conductive poly(9,10-di(1-naphthalenyl)-2-vinylanthracene) homopolymer and its highly soluble copolymers with styrene or 9-vinylcarbazole," Polym. Int. 2014; 63: 363-376. (Year: 2014).*

IBM, "List of IBM Patents or Patent Application Treated as Related," for U.S. Appl. No. 16/277,766, filed Feb. 15, 2019.

Webster, et al., "Controlling Light Oxidation Flavor in Milk by Blocking Riboflavin Excitation Wavelengths by Interference", Journal of Food Science, vol. 74, No. 9, Nov. 2009, 10 pp.

Gray, et al., "Photophysical Characterization of the 9, 10-Disubstituted Anthracene Chromophore and its Applications n Triplet-Triplet Annihilation Photon Unconversion", Royal Society of Chemistry, Sep. 21, 2015, 18 pp.

Seeking Blue Light Absorber Technology, Open Innovations, SpecialChem, viewed Apr. 6, 2016, 2 pp.

Zhang, et al., "Multifunctional Organic Flourescent Materials Derived from 9, 10-Distyrylanthracene with Alkoxyl Endgroups of Various Lengths", The Royal Society of Chemistry, Chem_ Comm, 2013, vol. 48, pp. 10895-10897.

Dadvand, et al., "1,5, 2,6- and 9, 10-distyrylanthracenes as Luminescent Organic Semiconductors", Journal of Material~ 18 hemistry C, 2013, vol. 1,, pp. 2817-2825.

* cited by examiner

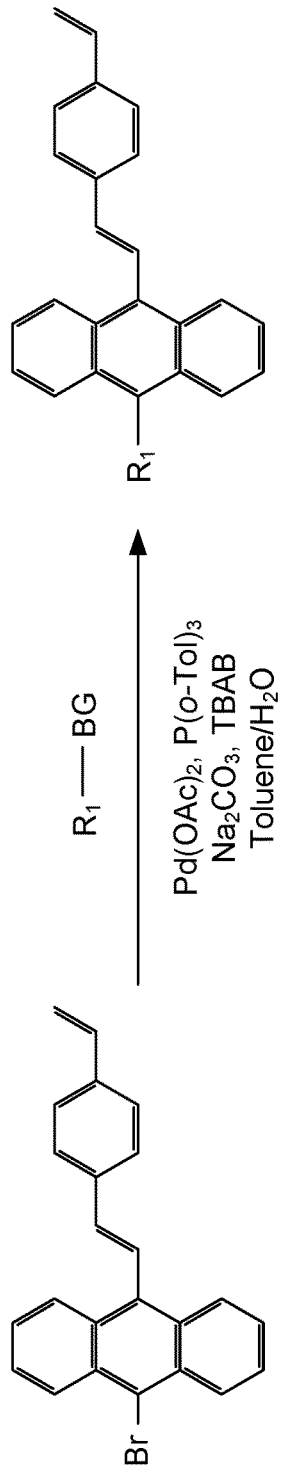

$R_1$—BG $Pd(OAc)_2$, $P(o\text{-}Tol)_3$
$Na_2CO_3$, TBAB
Toluene/$H_2O$

FIG. 4

$R_1$—BG, where $R_1$ is an electron-withdrawing group, including:

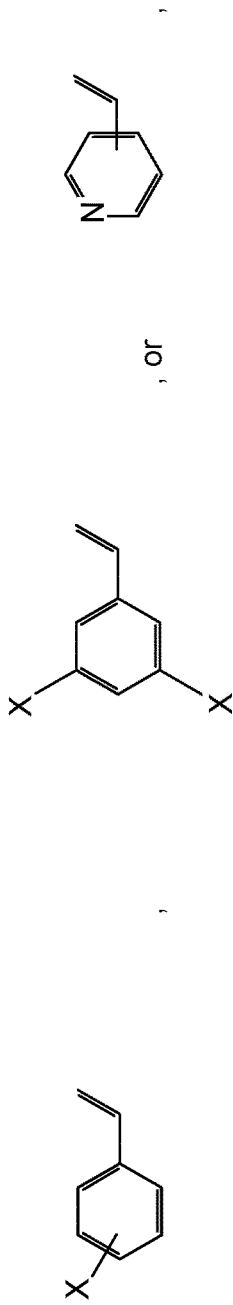

where X is in a *para*, *meta*, or *ortho* orientation relative to the styrl group when only one X is present, where X is one of Cl, F, $CF_3$, $NO_2$, and $CO_2R$, where R is an alkyl group of from 1 to 10 carbons, where the vinyl group is in a *para*, *meta*, or *ortho* orientation relative to the N of the pyridine, and where the boron group (BG) is one of:

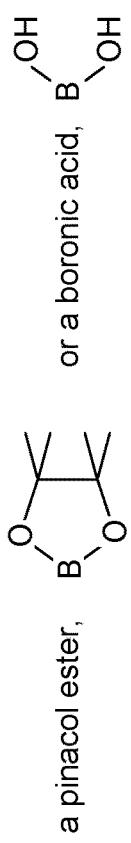

a pinacol ester, or a boronic acid,

FIG. 5

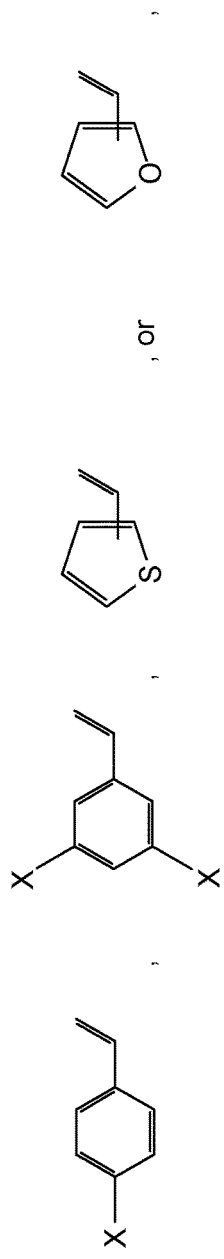
$R_1$—BG, where $R_1$ is a electron-donating group, including:
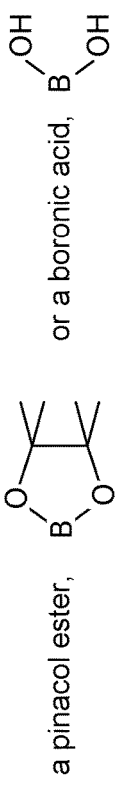
where X is one of $CH_3$, $H_3CO$, and a phenyl group, where the vinyl group is in a *meta* or *ortho* orientation relative to the thiophene group, where the vinyl group is in a *meta* or *ortho* orientation relative to the furan group, and where the boron group (BG) is one of:
a pinacol ester, or a boronic acid,
FIG. 6
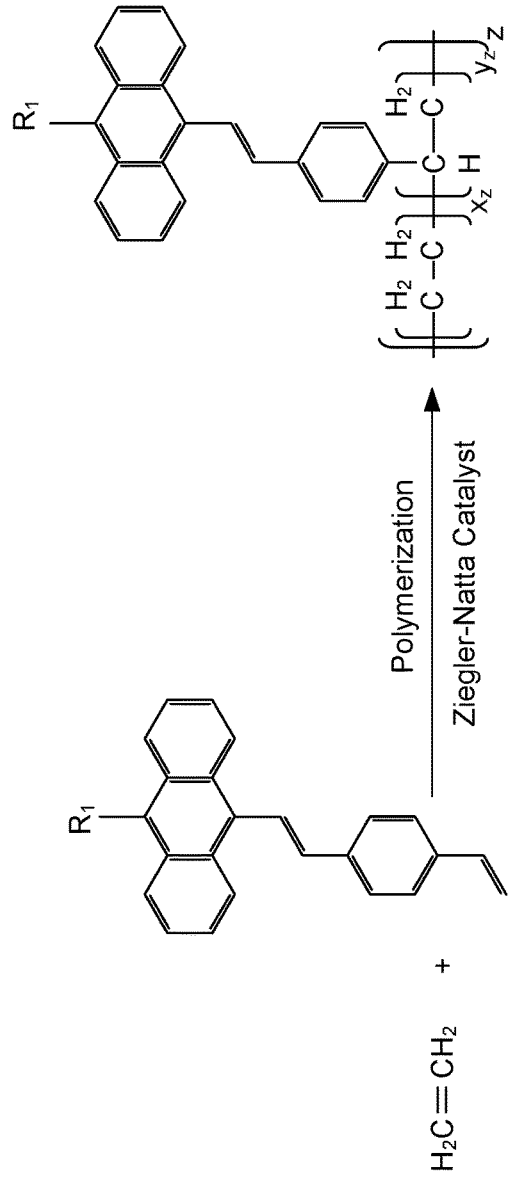
FIG. 7

POLYMER WITH BLUE LIGHT ABSORBING UNITS CHEMICALLY BONDED TO A POLYERMIC BACKBONE OF THE POLYMER

I. CROSS-REFERENCE TO RELATED APPLICATIONS

This application is a divisional of U.S. patent application Ser. No. 15/175,390, filed Jun. 7, 2016, now U.S. Pat. No. 10,266,325, which is incorporated herein by reference in its entirety.

II. FIELD OF THE DISCLOSURE

The present disclosure relates generally to a polymer with blue light absorbing units chemically bonded to a polymeric backbone of the polymer.

III. BACKGROUND

Products are often packaged in plastic containers that enable a user to visually inspect an amount of product in the plastic container. For some products, certain wavelength ranges of blue light can be damaging to the products. For example, exposure of milk to certain ranges of blue light may result in an undesired flavor change to the milk. As another example, exposure of some medicines to certain ranges of blue light can reduce effectiveness of the medicines. Also, exposure of certain plastics to certain wavelengths of blue light may result in degradation of the plastics.

During manufacture of plastic containers, blue light absorbers may be blended with the polymer to try to inhibit undesired effects of exposure to certain wavelengths of blue light. For some blends of one or more blue light absorbers and a polymer, the one or more blue light absorbers may induce a tint in a product made from the blend (e.g., the one or more blue light absorbers may induce a yellow tint in a container made of the blend). For some blends of one or more blue light absorbers and a polymer, a blue light absorption peak of the blend may be different than the blue light absorption peak of the one or more blue light absorbers. Also, the blue light absorbers may be able to leach out of the blend.

IV. SUMMARY OF THE DISCLOSURE

According to an embodiment, a polymer includes less than 99.5 percent by weight of units derived from one or more olefin monomers. The polymer also includes greater than 0.5 percent by weight of units derived from one or more blue light absorbing monomers.

According to another embodiment, a polymer includes less than 99.5 percent by weight of units derived from one or more olefin monomers. The polymer also includes greater than 0.5 percent by weight of units derived from one or more blue light absorbing monomers, wherein the one or more blue light absorbing monomers include one or more functionalized p-vinylstyrylanthracenes (pVSA) monomers.

According to another embodiment, a method includes placing a heated parison of a polymer in a mold. The polymer is formed by polymerizing a mixture of one or more olefin monomers and one or more blue light absorbing monomers. The polymer has one or more blue light absorption characteristics. The method includes closing the mold. The method includes injecting gas into the parison to form a container in the mold. The method also includes removing the container from the mold.

Features and other benefits that characterize embodiments are set forth in the claims annexed hereto and forming a further part hereof. However, for a better understanding of the embodiments, and of the advantages and objectives attained through their use, reference should be made to the Drawings and to the accompanying descriptive matter.

V. BRIEF DESCRIPTION OF THE DRAWINGS

FIG. 4 is a chemical reaction diagram of a fourth portion of the process of forming the blue light absorbing monomer that may be used to form the polymer with blue light absorbing units chemically bonded to the polymeric backbone of the polymer.

FIG. 5 is a depiction of embodiments of electron-withdrawing compounds that may be used as reactants in the fourth portion of the process of forming a blue light absorbing monomer that may be used to form a polymer with blue light absorbing units chemically bonded to a polymeric backbone of the polymer.

FIG. 6 is a depiction of embodiments of electron-donating compounds that may be used in the fourth portion of the process of forming a blue light absorbing monomer that may be used to form a polymer with blue light absorbing units chemically bonded to a polymeric backbone of the polymer.

FIG. 7 is a chemical reaction diagram of polymerization of an olefin with a blue light absorbing monomer to form a polymer with blue light absorbing units chemically bonded to a polymeric backbone of the polymer.

VI. DETAILED DESCRIPTION

Figure 1:
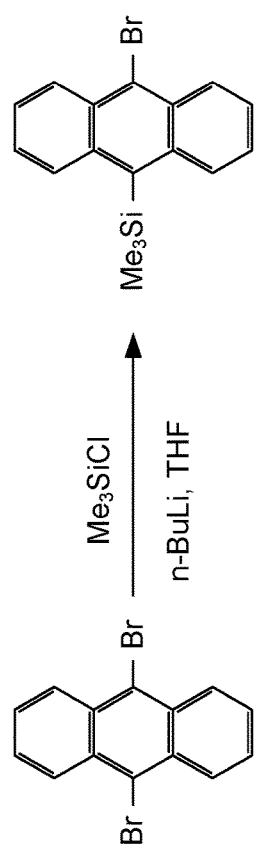
FIG. 1 is a chemical reaction diagram of a first portion of a process of forming a blue light absorbing monomer that may be used to form a polymer with blue light absorbing units chemically bonded to a polymeric backbone of the polymer.

The present disclosure describes a polymer with blue light absorbing units chemically bonded to a polymeric backbone of the polymer. The blue light absorbing units may impart blue light absorption characteristics to the polymer. The blue light absorption characteristics may include peak absorption at one or more particular wavelengths in a blue to violet section of a human visible portion of the light spectrum. The blue light absorption characteristics may include reduced transmission of a range of wavelengths of light in the blue to violet section of the human visible portion of the light spectrum. The blue light absorption characteristics may also include resistance to light induced degradation of the polymer.

The blue light absorbing units chemically bonded to the polymeric backbone may be covalently coupled to the polymeric backbone. Incorporating the blue light absorbing units in the polymeric backbone may inhibit leaching of the blue light absorbing units from the polymer. Incorporating the blue light absorbing units in the polymeric backbone may enable the polymer to be formed using a small amount of blue light absorbing monomer (e.g., from about 0.5 percent by weight to about 10 percent by weight of a mixture of blue light absorbing monomer and olefin monomer). The small amount of blue light absorbing monomer may result in little or no changes to processing characteristics, visual properties (e.g., tinting), other characteristics, or combinations thereof, as compared to a similar polymer without blue light absorbing units from the blue light absorbing monomer.

The blue light absorbing monomers may include functional groups to enable the polymer to have blue light absorption characteristics. In a first embodiment, the blue light absorbing monomer may be p-vinyldistyrylanthracene. In a second embodiment, a styryl group may be replaced with an electron-withdrawing group to shift a wavelength of peak absorption towards longer wavelengths (i.e., red shift the peak absorption) as compared to p-vinyldistyrylanthracene. In a third embodiment, a styryl group may be replaced with an electron-donating group to shift a wavelength of peak absorption towards shorter wavelengths. Selection of appropriate functional groups may enable production of blue light absorbing monomers that result in a polymer with particular blue light absorbing characteristics.

FIGS. 1-4 depict an illustrative, non-limiting example of synthesis of a blue light absorbing monomer (e.g., a functionalized p-vinylstyrylanthracene (pVSA) monomer) that may be used to form a polymer with blue light absorbing units chemically bonded to a polymeric backbone of the polymer. FIG. 5 depicts reactants with electron-withdrawing groups that may be used during production of the functionalized pVSA to add a functional group to the functionalized pVSA monomer. FIG. 6 depicts reactants with electron-donating groups that may be used during production of the functionalized pVSA monomer. FIG. 7 depicts reaction of an olefin monomer (i.e., ethylene) with the functionalized pVSA monomer.

FIG. 1 depicts a chemical reaction diagram of a first portion of a process of forming a blue light absorbing monomer that may be used to form a polymer with blue light absorbing units chemically bonded to a polymeric backbone of the polymer. In FIG. 1, an aryl bromide of 9, 10-dibromoanthracene in tetrahydrofuran (THF) may be protected using a trimethylsilyl group via lithium halogen exchange followed by quenching with trimethylsilyl chloride ($Me_3SiCl$) or another silane protecting group to yield a first intermediate.

Figure 2:
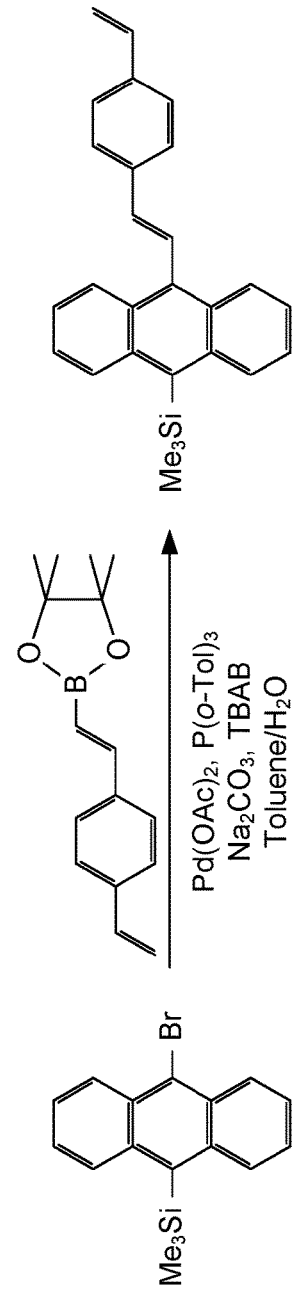
FIG. 2 is a chemical reaction diagram of a second portion of the process of forming the blue light absorbing monomer that may be used to form the polymer with blue light absorbing units chemically bonded to the polymeric backbone of the polymer.

FIG. 2 depicts a chemical reaction diagram of a second portion of the process of forming the blue light absorbing monomer that may be used to form the polymer with blue light absorbing units chemically bonded to the polymeric backbone of the polymer. In FIG. 2, the bromide of the first intermediate may be reacted with p-vinylstyryl boronic pinacol ester under Suzuki cross-coupling conditions to yield a second intermediate. For example, the reaction of the first intermediate with the p-vinylstyryl boronic pinacol ester may be conducted in the presence of palladium (II) acetate ($Pd(OAc)_2$), tri (o-tolyl) phosphine ($P(o-Tol)_3$), sodium carbonate ($Na_2CO_3$), tetra-n-butylammonium bromide (TBAB), toluene, and water. In other embodiments, a p-vinylstyrylboronic acid, other catalysts, other phase-transfer reagents, other solvents, or combinations thereof, may be used.

The p-vinylstyryl boronic pinacol ester may be purchased or synthesized. One process of forming p-vinylstyryl boronic pinacol ester may include reacting p-bromostyrene with tetramethylsilyl acetylene at Songashira conditions to yield an intermediate, removing the trimethylsilyl group under basic conditions, and reacting the intermediate with pinacol borane ester to form the p-vinylstyryl boronic pinacol ester.

Figure 3:
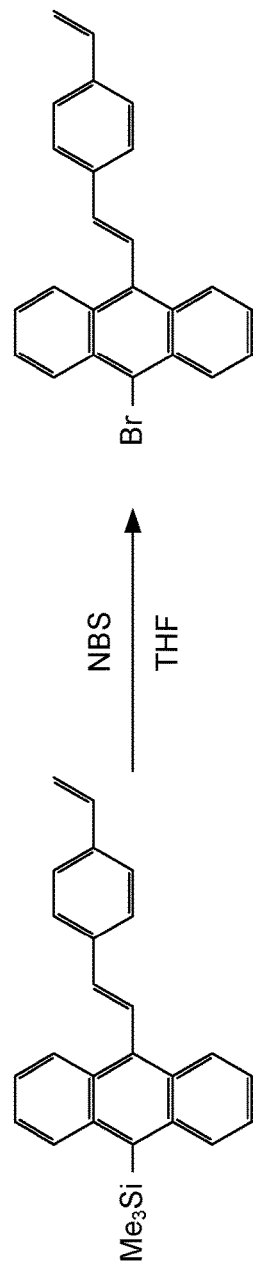
FIG. 3 is a chemical reaction diagram of a third portion of the process of forming the blue light absorbing monomer that may be used to form the polymer with blue light absorbing units chemically bonded to the polymeric backbone of the polymer.

FIG. 3 depicts a chemical reaction diagram of a third portion of the process of forming the blue light absorbing monomer that may be used to form the polymer with blue light absorbing units chemically bonded to the polymeric backbone of the polymer. In FIG. 3, the second intermediate, in THF, may be reacted with N-bromosuccinimide (NB S) to replace the trimethylsilyl ($Me_3Si$) group of the second intermediate with bromine, yielding a third intermediate.

FIG. 4 depicts a chemical reaction diagram of a fourth portion of the process of forming the blue light absorbing monomer that may be used to form the polymer with blue light absorbing units chemically bonded to the polymeric backbone of the polymer. In FIG. 4, the third intermediate may be reacted with a $R_1$-BG compound (an $R_1$ boronic ester or an $R_1$ boronic acid) under Suzuki cross-coupling conditions to yield the blue light absorbing monomer. For example, the reaction of the third intermediate with the $R_1$-BG compound may be conducted in the presence of $Pd(OAc)_2$, $P(o-Tol)_3$, $Na_2CO_3$, TBAB, toluene, and water to replace the bromine of the third intermediate with the $R_1$ group, yielding the blue light absorbing monomer (i.e., a functionalized pVSA monomer). In other embodiments, other catalysts and solvents may be used.

In an embodiment, the $R_1$ group of the $R_1$-BG compound may be a styryl group (e.g., the $R_1$-BG compound is styryl pinacol boronic ester or styrylboronic acid). When the $R_1$ group is the styryl group, the resulting blue light absorbing monomer may be a functionalized pVSA monomer (e.g., p-vinyldistyrylanthracene monomer).

In other embodiments, the $R_1$ group of the $R_1$-BG may include electron-withdrawing (EW) functionality or electron-donating (ED) functionality. Adding EW functionality or ED functionality to the third intermediate via the fourth reaction may yield a pVSA monomer that enables a polymer formed with the pVSA monomer to have particular blue light absorption characteristics. Relative strength and position of EW groups or ED groups in one or more pVSA monomers used to form the polymer may be varied to impart a range of absorbance profiles to resulting copolymers formed from the pVSA monomers.

FIG. 5 depicts embodiments of representative electron-withdrawing compounds (e.g., $R_1$-BG compounds) that may be used as reactants in the fourth portion of the process of forming the blue light absorbing monomer that may be used to form the polymer with blue light absorbing units chemically bonded to the polymeric backbone of the polymer. Adding one or more types of EW groups to pVSA monomers used to form the polymer may shift a maximum absorption peak wavelength of the polymer formed with the pVSA monomers towards green light as compared to a similar polymer formed with p-vinyldistyrylanthracene monomer.

FIG. 6 depicts embodiments of representative electron-donating compounds (e.g., $R_1$-BG compounds) that may be used as reactants in the fourth portion of the process of forming the blue light absorbing monomer that may be used to form the polymer with blue light absorbing units chemically bonded to the polymeric backbone of the polymer. Adding one or more types of ED groups to pVSA monomers used to form the polymer may shift the maximum absorption peak of the polymer formed with monomer the pVSA monomers towards ultraviolet light as compared to a similar polymer formed with p-vinyldistyrylanthracene monomer.

Thus, FIGS. 1-6 depict the synthesis of functionalized pVSA monomers starting from 9, 10-dibromoanthracene. In other embodiments, the functionalized pVSA monomers may be synthesized using one or more different reactions in lieu of, or in combination with, one or more of the reactions depicted in FIGS. 1-4. The functionalized pVSA monomers may be used in the production of polymers with blue light absorbing units chemically bonded to a polymeric backbone of the polymer. Selection of one or more functional groups chemically bonded to one or more functionalized pVSA monomers may enable tailoring of blue light absorption characteristics of polymers formed using the one or more functionalized pVSA monomers.

FIG. 7 depicts a chemical reaction diagram of polymerization of an olefin monomer with a blue light absorbing monomer to form a polymer with blue light absorbing units chemically bonded to a polymeric backbone of the polymer. In FIG. 7, a mixture of ethylene and pVSA monomer is polymerized using a Ziegler-Natta catalyst to produce the polymer. The blue light absorbing units chemically bonded to the polymer may be aperiodically located in the polymer.

In other embodiments, the mixture may include one or more olefin monomers and one or more blue light absorbing monomers. A Ziegler-Natta catalyst or other catalyst may be used to polymerize contents of the mixture. The one or more blue light absorbing monomers may include one or more functionalized pVSA monomers. The pVSA monomers may be produced via the reactions depicted in FIGS. 1-4 or by alternate synthetic processes. Functional groups of the one or more functionalized pVSA monomers may include a p-styryl group, an electron-withdrawing group (e.g., one or more of the $R_1$ groups depicted in FIG. 5), an electron-donating group (e.g., one or more of the $R_1$ groups depicted in FIG. 6), or combinations thereof. The particular functional groups included in the one or more functionalized pVSA monomers may enable tailoring of blue light absorption characteristics of the polymer.

The vinyl groups of the one or more pVSA monomers may react with vinyl groups of the one or more olefin monomers, vinyl groups of other pVSA monomers, or both, during polymerization, which may result in blue light absorbing units derived from the pVSA being aperiodically located in the polymer. The polymer may include less than 99.5 percent by weight of units derived from the one or more olefin monomers and greater than 0.5 percent by weight of units derived from the one or more pVSA monomers.

The one or more olefin monomers may include various olefins. For example, the olefin monomers may include ethylene, propylene, styrene, other olefins, or combinations thereof.

Thus, FIG. 7 illustrates an example of a reaction to produce a polymer with one or more blue light absorption characteristics. The polymer may be formed from one or more pVSA monomers reacted with one or more olefin monomers to incorporate blue light absorbing units from the pVSA monomers into a polymeric backbone of the polymer.

Figure 8:
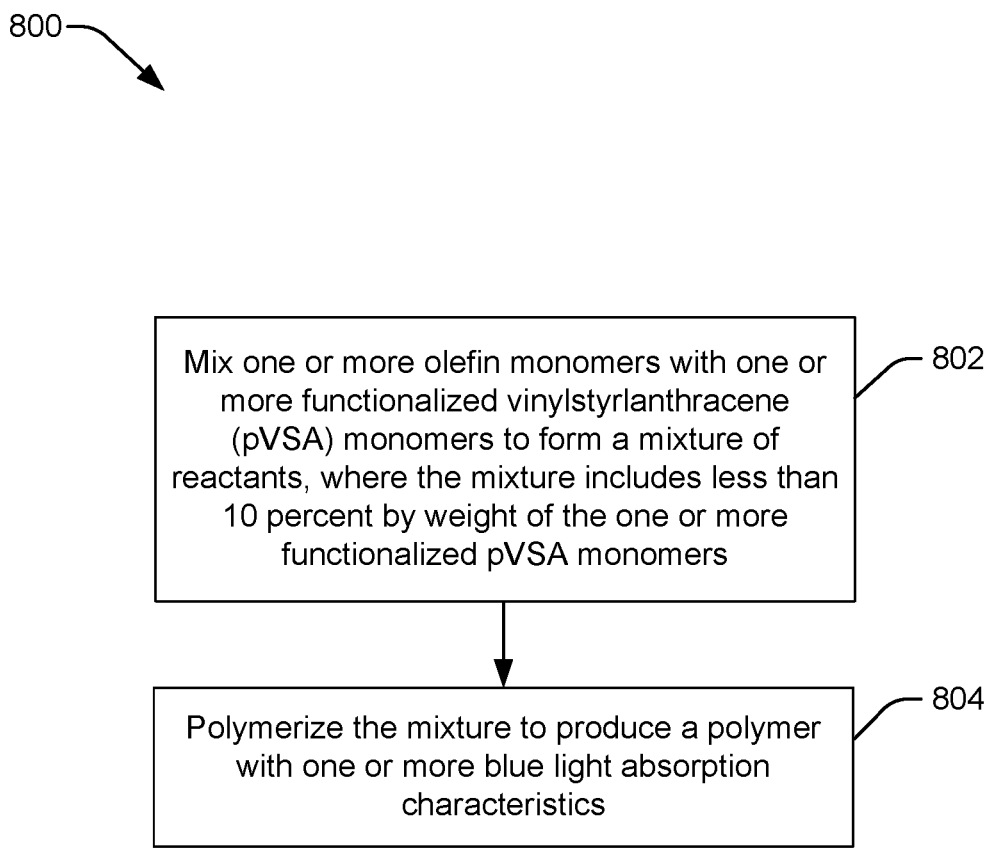
FIG. 8 is a flow diagram of a process of forming a polymer, the polymer having blue light absorbing units chemically bonded to a polymeric backbone of the polymer.

Referring to FIG. 8, a flow diagram illustrates an example of a process 800 of producing a polymer with blue light absorbing units covalently bonded to a polymer backbone.

The process 800 may include mixing one or more olefin monomers with one or more functionalized pVSA monomers, at 802. The one or more functionalized pVSA monomers may be produced using the reactions depicted in FIGS. 1-4 or via an alternate synthesis scheme. In an embodiment, the mixture may include less than 10 percent by weight of the one or more functionalized pVSA monomers. In other embodiments, the mixture may include less than 5 percent by weight, less than 3 percent by weight, or less than 1 percent by weight, of the one or more functionalized pVSA monomers.

The process 800 may also include reacting the mixture to produce a polymer with one or more blue light absorption characteristics, at 804. Reacting the mixture may covalently couple units derived from the one or more functionalized pVSA monomers to the backbone of the polymer. The units derived from the one or more functionalized pVSA monomers may provide the one or more blue light absorption characteristics to the polymer. The one or more blue light absorption characteristics may include a peak absorption in a blue to violet section of a human visible portion of the light spectrum. The one or more blue absorption characteristics may also include an ability to reduce transmission of at least 20 percent of a wavelength range of light, where the wavelength range is in the blue to violet section of the human visible portion of the light spectrum.

The particular peak absorption wavelength and the particular wavelength range may depend on functional groups of the one or more functionalized pVSA monomers. For example, the presence of electron-withdrawing groups as the functional groups of the one or more functionalized pVSA monomers may enable the peak absorption to be at a longer wavelength than the peak for a second polymer where the one or more functionalized pVSA monomers include electron-donating groups as the functional groups of the one or more functionalized pVSA monomers.

Covalently coupling the units derived from the one or more functionalized pVSA monomers to the backbone of the polymer may inhibit subsequent leaching of the blue light absorbing compounds from the polymer. The units derived from the one or more functionalized pVSA monomers may be aperiodically distributed among the units derived from the one or more olefins monomers.

Thus, FIG. 8 illustrates an example of a process of producing a polymer with one or more blue light absorption characteristics. The polymer may be formed from one or more pVSA monomers reacted with one or more olefin monomers. Particular pVSA monomers reacted with the one or more olefin monomers may allow the one or more blue light absorbing characteristics to be tailored for needs of a particular product to be formed from the polymer.

Figure 9:
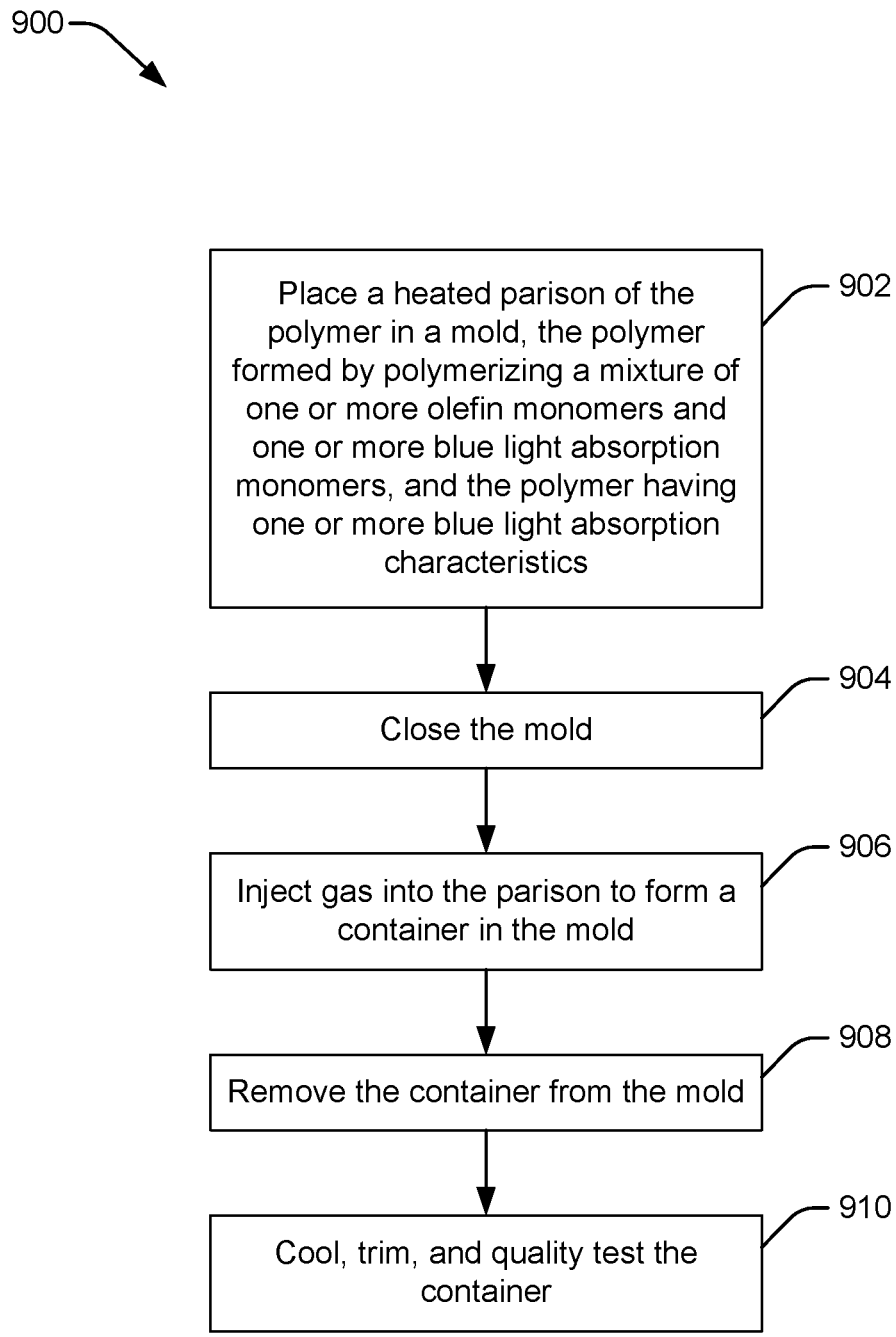
FIG. 9 is a flow diagram of a method of forming an article of manufacture using a polymer having blue light absorbing units chemically bonded to a polymeric backbone of the polymer.

Referring to FIG. 9, a flow diagram illustrates an example of a method 900 of forming an article of manufacture with blue light absorbing units covalently bonded to a polymeric backbone. The polymer may have one or more blue light absorption characteristics. The article of manufacture may include or correspond to a container (e.g., a bottle). In other embodiments, the polymer may be used in other products, including but not limited to lenses, lens filters, plastic bags, covers, clothing, other products, or combinations thereof.

The method 900 may include placing a heated parison of a polymer in a mold, at 902. The polymer may be formed by polymerizing a mixture of one or more olefin monomers (e.g., ethylene, propylene, or both) and one or more blue light absorbing monomers (e.g., one or more functionalized pVSA monomers). The polymer may be produced by the reaction depicted in FIG. 7.

The polymer may have one or more blue light absorption characteristics. For example, the polymer may have a peak blue light absorption at about 470 nm and may reduce transmission of blue light in a wavelength range of from about 460 to 480 by at least 20 percent. The particular blue light absorption characteristics of the polymer may be determined by one or more groups present in the one or more blue light absorption monomers. For example, when the blue light absorbing monomers are functionalized pVSA monomers, the presence of electron-donating groups in the functionalized pVSA monomers may shift the peak blue light absorption towards shorter wavelengths (e.g., towards or into a violet light portion of the human visible light spectrum). The particular blue light absorbing monomers used to produce the polymer may be produced by the reactions depicted in FIGS. 1-4 or by other synthesis schemes that yield pVSAs or other blue light absorbing monomers.

The mold may be closed, at 904. A gas (e.g., air) may be injected into the parison to form a container in the mold, at 906. The mold may be opened. The container may be removed from the mold, at 908. The container may be cooled, trimmed, and quality tested, at 910. The container may be at least partially transparent in a human visible portion of the light spectrum to enable a person to see content placed in the container. The one or more blue light absorption characteristics of the polymer may enable transmission reduction of a range of blue light wavelengths through the container.

Thus, FIG. 9 illustrates an example of a method of forming an article of manufacture with a polymer. The polymer may be formed from monomers including one or more blue light absorbing monomers. The one or more blue light absorbing monomers may be chemically bonded to the backbone of the polymer. The one or more blue light absorbing monomers may incorporate one or more blue light absorption characteristics into the polymer, and thus, into the article of manufacture.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and features as defined by the following claims.

The invention claimed is:

1. A polymer comprising:
less than 99.5 percent by weight of units derived from one or more olefin monomers; and
greater than 0.5 percent by weight of units derived from one or more blue light absorbing monomers, wherein the units derived from the one or more blue light absorbing monomers are aperiodically distributed among the units derived from the one or more olefin monomers.

2. The polymer of claim 1, wherein the one or more olefin monomers comprise ethylene, propylene, styrene, or a combination thereof.

3. The polymer of claim 1, wherein the one or more blue light absorbing monomers include one or more functionalized p-vinylstyrylanthracene monomers.

4. The polymer of claim 3, wherein p-vinyl groups of the one or more functionalized p-vinylstyrylanthracene monomers react with the one or more olefin monomers during polymerization.

5. The polymer of claim 4, wherein functional groups of the one or more functionalized p-vinylstyrylanthracene monomers include electron-withdrawing functionality.

6. The polymer of claim 4, wherein functional groups of the one or more functionalized p-vinylstyrylanthracene monomers include electron-donating functionality.

7. The polymer of claim 1, wherein the polymer absorbs at least 20 percent of a portion of a wavelength range of light, the wavelength range in a blue to violet section of a human visible portion of a light spectrum.

8. A polymer comprising:
less than 99.5 percent by weight of units derived from one or more olefin monomers; and
greater than 0.5 percent by weight of units derived from one or more blue light absorbing monomers, wherein the one or more blue light absorbing monomers include one or more functionalized p-vinylstyrylanthracene monomers.

9. The polymer of claim 8, wherein the one or more olefin monomers comprise ethylene, propylene, styrene, or a combination thereof.

10. The polymer of claim 8, wherein the units derived from the one or more blue light absorbing monomers are aperiodically distributed among the units derived from the olefin monomers.

11. The polymer of claim 8, wherein p-vinyl groups of the one or more functionalized p-vinylstyrylanthracene monomers react with the one or more olefin monomers during polymerization.

12. The polymer of claim 11, wherein functional groups of the one or more functionalized p-vinylstyrylanthracene monomers include electron-withdrawing functionality.

13. The polymer of claim 11, wherein functional groups of the one or more functionalized p-vinylstyrylanthracene monomers include electron-donating functionality.

14. The polymer of claim 8, wherein the polymer absorbs at least 20 percent of a portion of a wavelength range of light, the wavelength range in a blue to violet section of a human visible portion of a light spectrum.

15. A polymer comprising:
less than 99.5 percent by weight of units derived from one or more olefin monomers; and
greater than 0.5 percent by weight of units derived from one or more blue light absorbing monomers, wherein the polymer absorbs at least 20 percent of a portion of a wavelength range of light, the wavelength range in a blue to violet section of a human visible portion of a light spectrum.

16. The polymer of claim 15, wherein the units derived from the one or more blue light absorbing monomers are aperiodically distributed among the units derived from the olefin monomers.

17. The polymer of claim 15, wherein the one or more blue light absorbing monomers include one or more functionalized vinylstyrylanthracene monomers.

18. The polymer of claim 17, wherein functional groups of the one or more functionalized p-vinylstyrylanthracene monomers include electron-withdrawing functionality.

19. The polymer of claim 17, wherein functional groups of the one or more functionalized p-vinylstyrylanthracene monomers include electron-donating functionality.

20. The polymer of claim 15, wherein the one or more olefin monomers comprise ethylene, propylene, styrene, or a combination thereof.

\* \* \* \* \*